US010825384B2

(12) United States Patent
Ma et al.

(10) Patent No.: US 10,825,384 B2
(45) Date of Patent: Nov. 3, 2020

(54) DISPLAY PANEL AND DISPLAY DEVICE

(71) Applicant: Wuhan China Star Optoelectronics Semiconductor Display Technology Co., Ltd., Wuhan (CN)

(72) Inventors: Yalong Ma, Wuhan (CN); Qibing Dai, Wuhan (CN); Yichao Deng, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 16/492,132

(22) PCT Filed: May 7, 2019

(86) PCT No.: PCT/CN2019/085741
§ 371 (c)(1),
(2) Date: Sep. 8, 2019

(65) Prior Publication Data

US 2020/0312236 A1 Oct. 1, 2020

(30) Foreign Application Priority Data

Mar. 27, 2019 (CN) .......................... 2019 1 0236759

(51) Int. Cl.

| | |
|---|---|
| ***G06F 3/038*** | (2013.01) |
| ***G09G 5/00*** | (2006.01) |
| ***G09G 3/3225*** | (2016.01) |

(52) U.S. Cl.
CPC ... *G09G 3/3225* (2013.01); *G09G 2300/0861* (2013.01)

(58) Field of Classification Search
CPC . G06F 2203/04104; G06F 2203/04107; G06F 3/0412; G06F 3/0416; G06F 3/044; G06F 3/04164; G06F 3/04166; G06F 3/0446
See application file for complete search history.

(56) References Cited

U.S. PATENT DOCUMENTS

2012/0113038 A1* 5/2012 Chen .................... G06F 3/0416 345/173
2017/0344180 A1* 11/2017 Li ........................ G06F 3/0416

* cited by examiner

*Primary Examiner* — Insa Sadio

(57) ABSTRACT

The present disclosure provides a display panel and a display device, wherein the display panel includes at least one of the plates of the storage capacitor provided with a charging element. By providing the charging element, charging the storage capacitor when the storage capacitor is discharged, so that the charge of the storage capacitor tends to stable or keep stable. That is, the voltage supplied from the storage capacitor to the driving transistor is ensured to constant, so that the luminance of the pixel is not distorted.

20 Claims, 9 Drawing Sheets

DISPLAY PANEL AND DISPLAY DEVICE

RELATED APPLICATIONS

This application is a National Phase of PCT Patent Application No. PCT/CN2019/085741 having International filing date of May 7, 2019, which claims the benefit of priority of Chinese Patent Application No. 201910236759.2 filed on Mar. 27, 2019. The contents of the above applications are all incorporated by reference as if fully set forth herein in their entirety.

FIELD AND BACKGROUND OF AND INVENTION

The present disclosure relates to the field of display technology, in particular to display panel and display device.

Active matrix organic light emitting diode (AMOLED) display technology has wide color gamut, low power consumption, and AMOLED display panels are lighter and thinner than liquid crystal display panels, making them widely used in display devices.

Principle of AMOLED current pixel circuit is shown in FIG. 1, where a scanning signal line 111 controls on and off of a switching transistor 121. When the switching transistor 121 is switched on, a data line 112 charging a storage capacitor 131 until saturation. After the transistor 121 switched off, a voltage of the storage capacitor 131 maintains a drive transistor 122 in an on state, thereby maintaining the LED light source 141 to continuously illuminate.

However, due to parasitic capacitance between the storage capacitor and the scanning signal line, when the scanning signal line is turned off, the storage capacitor is discharged through the parasitic capacitor, thereby causing an amount of charge of the storage capacitor decreased, thereby causing a voltage supplied from the storage capacitor to the drive transistor decreased, causing distorted luminance of the LED light source.

Therefore, the current pixel circuit has a defect that the storage capacitor is discharged through the parasitic capacitance, which is needed to improve.

SUMMARY OF THE INVENTION

The present disclosure provides a display panel and a display device for alleviating the technical problem that a storage capacitor is discharged through a parasitic capacitor of current pixel circuit.

To solve the above problems, the technical solution provided by the present disclosure is as follows:

The present disclosure provides a display panel, the display panel includes:

a substrate;

a first metal layer, disposed on the substrate, that is patterned to form a gate of a transistor;

an interlayer insulating layer; and a second metal layer, disposed on a side of the interlayer insulating layer away from the first metal layer, patterned to form an electrode plate;

wherein the electrode plate overlaps the gate to form a first plate and a second plate of the storage capacitor, at least one of the plates of the storage capacitor is provided with a charging element, and the charging element is used for charging the storage capacitor.

In the display panel provided by the present disclosure, the charging element includes an inductance structure disposed on at least one of the plates of the storage capacitor.

In the display panel provided by the present disclosure, the inductance structure includes a first inductance, the first inductance formed by hollowing out the first plate.

In the display panel provided by the present disclosure, the first inductance has a homocentric squares shape structure which is not connected end to end.

In the display panel provided by the present disclosure, the first inductance has an annular structure which is not connected end to end.

In the display panel provided by the present disclosure, the first inductance is a composite structure consisting of an annular shape and a homocentric squares shape that are not connected end to end.

In the display panel provided by the present disclosure, the inductance structure further includes a second inductance, the second inductance formed by hollowing out the first plate, and the second inductance is insulated from the first inductance.

In the display panel provided by the present disclosure, the inductance structure further includes a third inductance, and the third inductance formed by hollowing out the second plate.

In the present disclosure provides a display panel, a hollow shape of the third inductance is same as a hollow shape of the first inductance.

In the display panel provided by the present disclosure, a projection of the third inductance coincides with a projection of the first inductance on the substrate.

Meanwhile, the present disclosure provides a display device including a display panel, the display panel includes:

a substrate;

a first metal layer on the substrate, that is patterned to form a gate of the transistor;

an interlayer insulating layer; and a second metal layer, disposed on a side of the interlayer insulating layer away from the first metal layer, patterned to form an electrode plate;

wherein the electrode plate overlaps with the gate to form a first plate and a second plate of a storage capacitor, at least one of the plates of the storage capacitor is provided with a charging element, and the charging element is used for charging the storage capacitor.

In the display device provided in the present disclosure, the charging element includes an inductance structure disposed on at least one of the plates of the storage capacitor.

In the display device provided in the present disclosure, the inductance structure includes a first inductance, the first inductance formed by hollowing out the first plate.

In the display device provided in the present disclosure, the first inductance has a homocentric squares shape structure which is not connected end to end.

In the display device provided in the present disclosure, the first inductance has an annular structure which is not connected end to end.

In the display provided in the present disclosure, the first inductance is a composite structure consisting of an annular shape and a homocentric squares shape that are not connected end to end.

In the display device provided in the present disclosure, the inductance structure further includes a second inductance, the second inductance formed by hollowing out the first plate, and the second inductance is insulated from the first inductance.

In the display device provided in the present disclosure, the inductance structure further comprises a third inductance, the third inductance formed by hollowing out the second plate.

In the display device provided in the present disclosure, a hollow shape of the third inductance is same as a hollow shape of the first inductance.

In the display device provided in the present disclosure, a projection of the third inductance coincides with a projection of the first inductance on the substrate.

Beneficial effect of the present disclosure: The present disclosure provides a display panel and a display device, the display panel includes a substrate, a first metal layer, an interlayer insulating layer and a second metal layer, the first metal layer disposed on the substrate, that is patterned to form a gate of a transistor, the second metal layer is disposed on a side of the interlayer insulating layer away from the first metal layer, patterned to form an electrode plate, and patterned to form an electrode plate, wherein the electrode plate overlaps the gate to form a first plate and a second plate of the storage capacitor, at least one of the plates of the storage capacitor is provided with a charging element, and the charging element is used for charging the storage capacitor. By disposing a charging element on at least one of the plates of the storage capacitor, when the storage capacitor is discharged, the charging element charging the storage capacitor, so that charge of the storage capacitor tends to stable or keep stable, so that the charge of the storage capacitor tends to stable or keep stabling. That is, the voltage supplied from the storage capacitor to the driving transistor is ensured to constant, so that the luminance of the pixel is not distorted. Which solves the technical problem of the current pixel circuit.

BRIEF DESCRIPTION OF THE SEVERAL VIEWS OF THE DRAWINGS

The accompanying figures to be used in the description of embodiments of the present disclosure or prior art will be described in brief to more clearly illustrate the technical solutions of the embodiments or the prior art. Obviously, the accompanying figures described below are only part of the embodiments of the present disclosure, from which figures those skilled in the art can derive further figures without making any inventive efforts.

DESCRIPTION OF SPECIFIC EMBODIMENTS OF THE INVENTION

Figure 1:
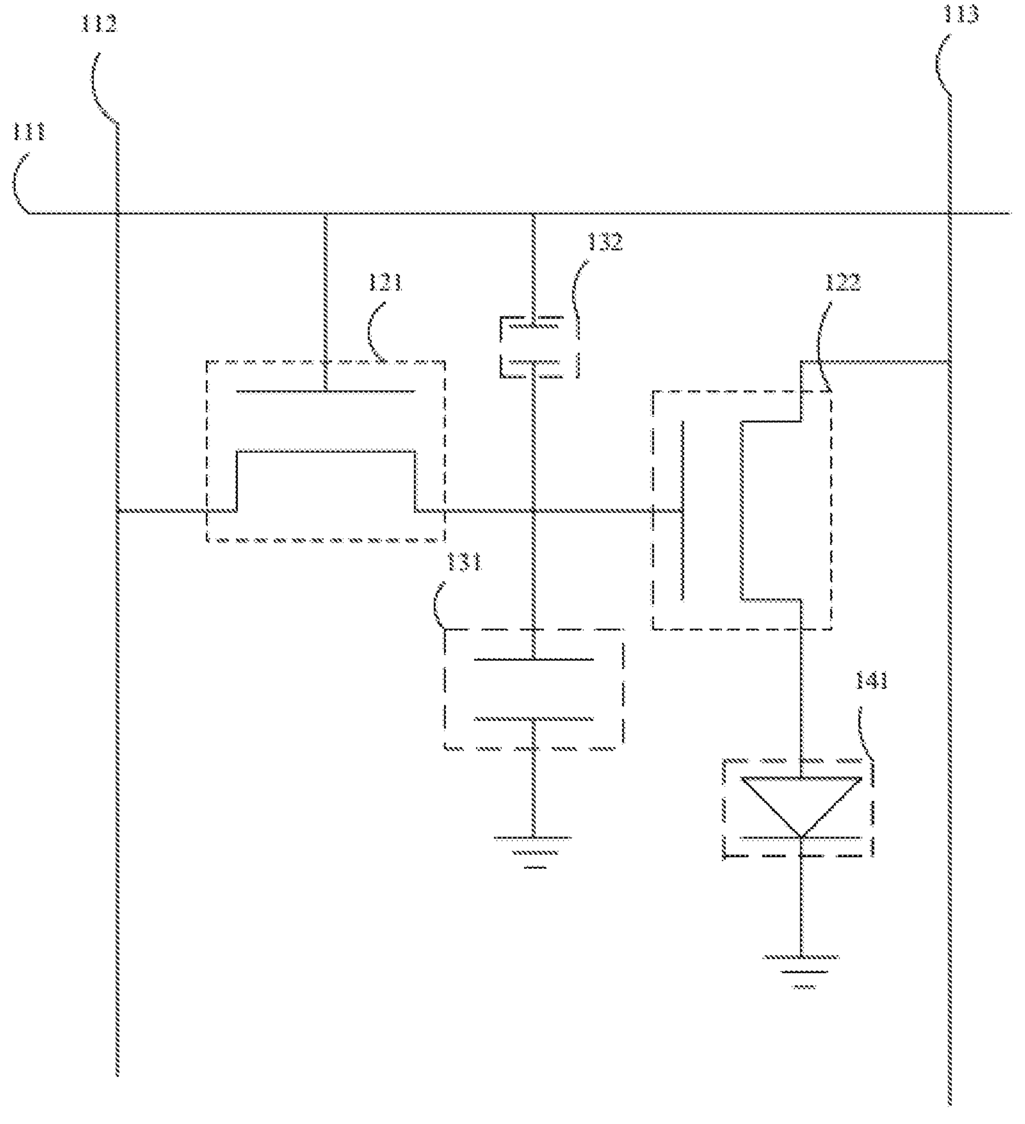
FIG. 1 is a schematic diagram of a current pixel circuit.

The following description of the various embodiments is provided to illustrate the specific embodiments. Directional terms described by the present disclosure, such as top, bottom, front, back, left, right, inner, outer, side, etc., are only directions by referring to the accompanying drawings, and thus the used terms are used only for the purpose of describing embodiments of the present disclosure and are not intended to be limiting of the present disclosure. In the drawings, units with similar structures are labeled with the same reference number.

The present disclosure direct to the technical problem that the storage capacitor of the current pixel circuit is discharged through the parasitic capacitance, and the embodiment of the present disclosure can alleviate the problem.

As shown in FIG. 1, the current pixel circuit includes a scanning signal line 111, a data line 112, a power line 113, a switching transistor 121, a driving transistor 122, a storage capacitor 131 and a LED light source 141. There is a parasitic capacitance 132 between the storage capacitor 131 and the scanning signal line 111, and the switching transistor 121 control the scanning signal line 111 turn on and turn off. When the switching transistor 121 is turned on, the data line 112 charge the storage capacitor 131 until saturation, and when the switching transistor 121 is turned off, the storage capacitor 131 charge a gate of the transistor 122 to keep the gate voltage unchanged. However, because of the discharging from the storage capacitor 131 to the parasitic capacitor 132, a voltage of the gate is decreased and the luminance of the LED light source 141 is distorted. Therefore, the current pixel circuit has defects and needs to improve.

Figure 2:
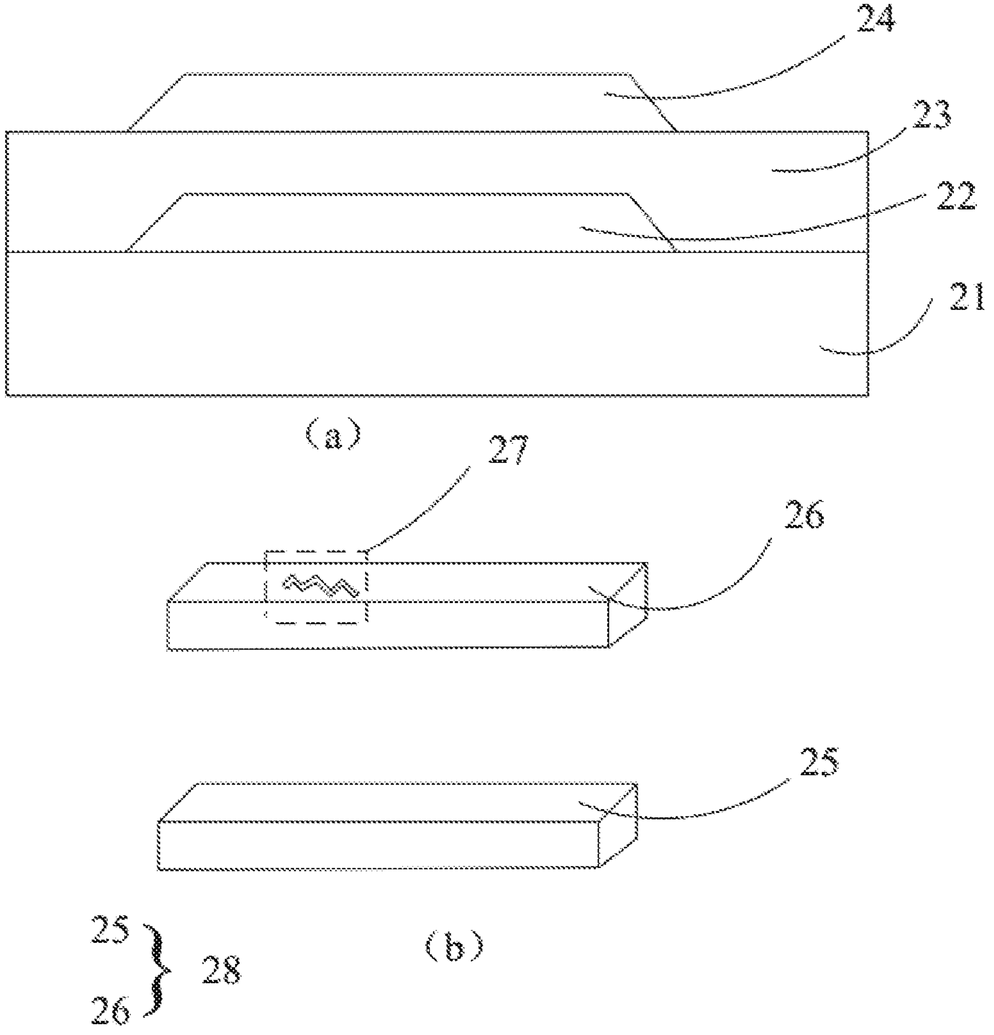
FIG. 2 is a first schematic diagram of a display panel provided in an embodiment of the present disclosure.

As shown in FIG. 2, an embodiment of the present disclosure provides a display panel, the display panel comprising:

a substrate 21;

a first metal layer 22, disposed on the substrate 21, that is patterned to form a gate 25 of the transistor;

an interlayer insulating layer 23; and a second metal layer 24, disposed on a side of the interlayer insulating layer 23 away from the first metal layer 22, patterned to form an electrode plate 26;

wherein the electrode plate 26 overlaps the gate 25 to form a first plate and a second plate of a storage capacitor 28, at least one of the plates of the storage capacitor 28 is provided with a charging element 27, and the charging element 27 is used for charging the storage capacitor 28.

An embodiment of the present disclosure provides a display panel and a display device, the display panel includes a substrate, a first metal layer, an interlayer insulating layer and a second metal layer, the first metal layer disposed on the substrate, that is patterned to form a gate of a transistor, the second metal layer is disposed on a side of the interlayer insulating layer away from the first metal layer, patterned to form an electrode plate, and patterned to form an electrode plate, wherein the electrode plate overlaps the gate to form a first plate and a second plate of the storage capacitor, at least one of the plates of the storage capacitor is provided with a charging element, and the charging element is used for charging the storage capacitor. By disposing a charging element on at least one of the plates of the storage capacitor, when the storage capacitor is discharged, the charging element charging the storage capacitor, so that the charge of the storage capacitor tends to stable or keep stable. That is, the voltage supplied from the storage capacitor to the driving transistor is ensured to constant, so that the luminance of the pixel is not distorted. Which solves the technical problem of the current pixel circuit.

It should be noted that the gate overlaps the electrode plate to form the first plate and the second plate of the storage capacitor. The gate and the electrode plate are marked in FIG. 2. To avoid repeated labels, the first plate and the second plate are not marked, wherein the first plate and the second plate are respectively the gate and the electrode plate which are overlapped.

Figure 3:
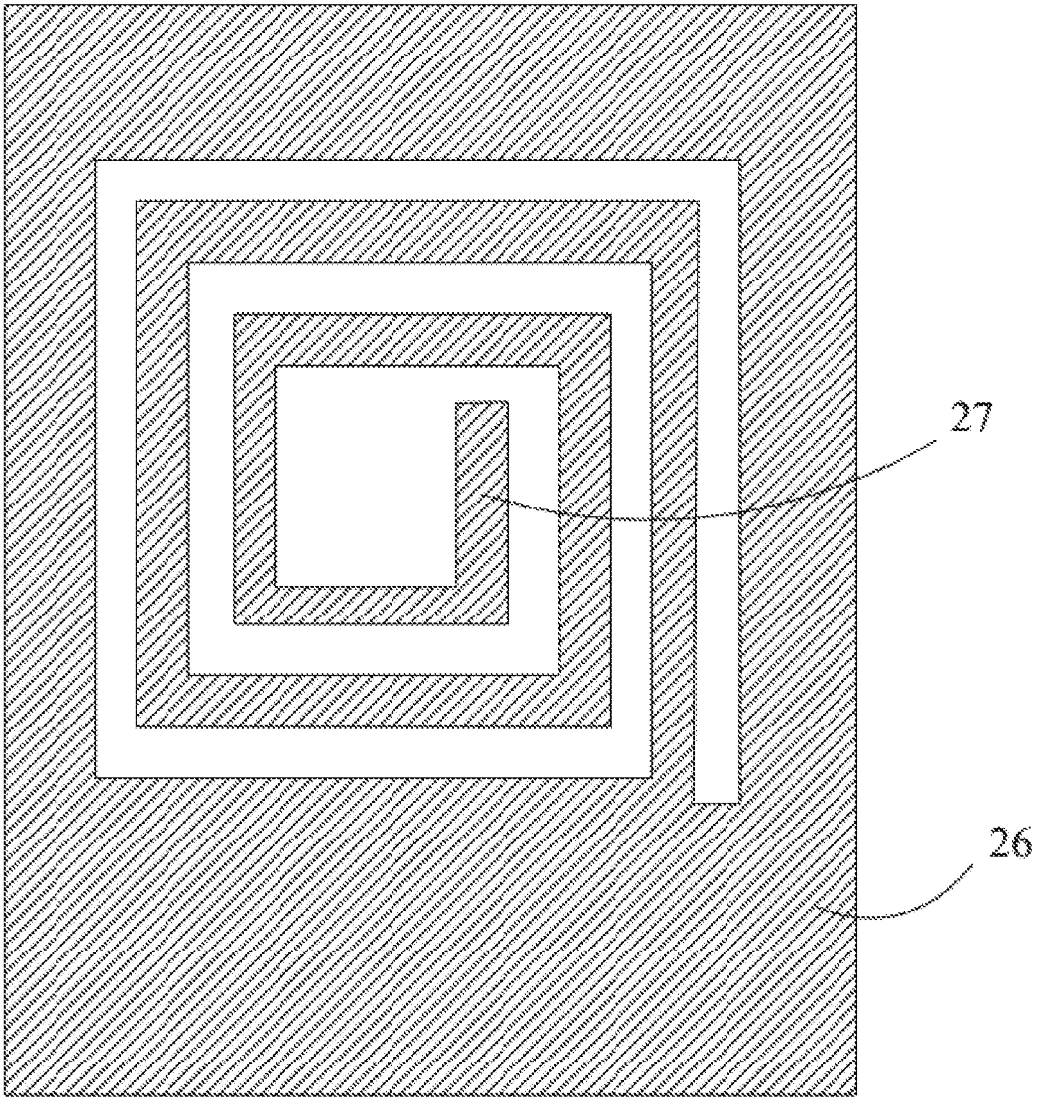
FIG. 3 is a first schematic diagram of a structure of an electrode plate according to an embodiment of the present disclosure.

As shown in FIG. 3, an embodiment of the present disclosure provides a structure of an electrode plate, and the electrode plate 26 is hollowed out to form an inductance 27.

It should be noted that the inductance is formed by the electrode plate, and is a part of the electrode plate, for example, a homocentric squares shape portion in FIG. 3. Which will not be described in the following embodiments.

In an embodiment, the charging element includes an inductance structure disposed on at least one of the plates of the storage capacitor. As shown in FIG. 3, the electrode plate of the storage capacitor is hollowed out to form an inductance has a homocentric squares shape. So that the storage capacitor does not affect the operation, when the storage capacitor is discharged, the storage capacitor can be charged. Thereby keeping the storage capacitor stable, a gate voltage of the driving transistor is stabilized, so that illumination of the pixel is not distorted.

Figure 4:
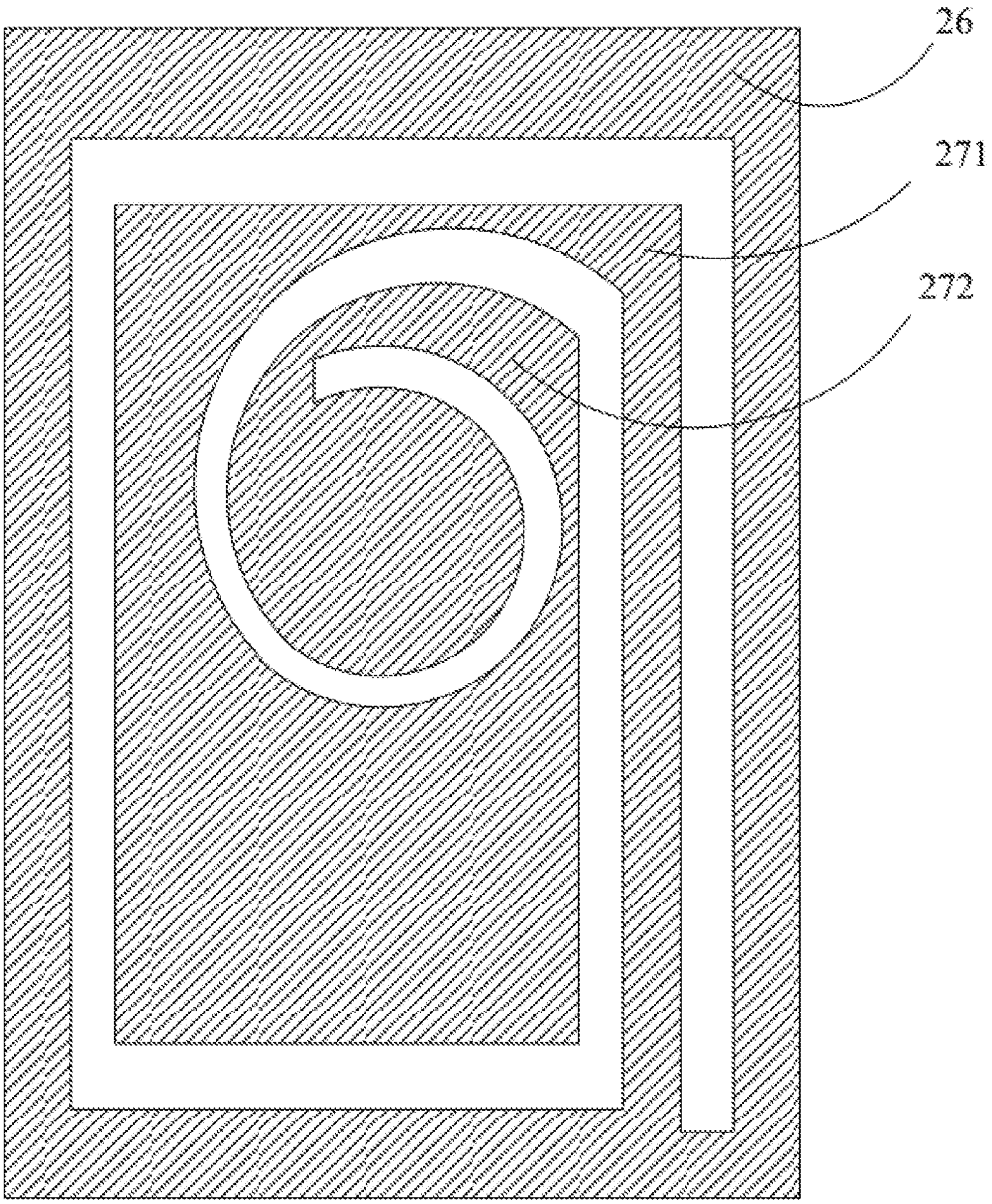
FIG. 4 is a second schematic diagram of a structure of an electrode plate according to an embodiment of the present disclosure.

As shown in FIG. 4, an embodiment of the present disclosure provides a structure of an electrode plate, wherein the electrode plate 26 is hollowed out to form a composite structure consisting of a homocentric squares shape inductance 271 and an annular shape inductance 272.

Figure 5:
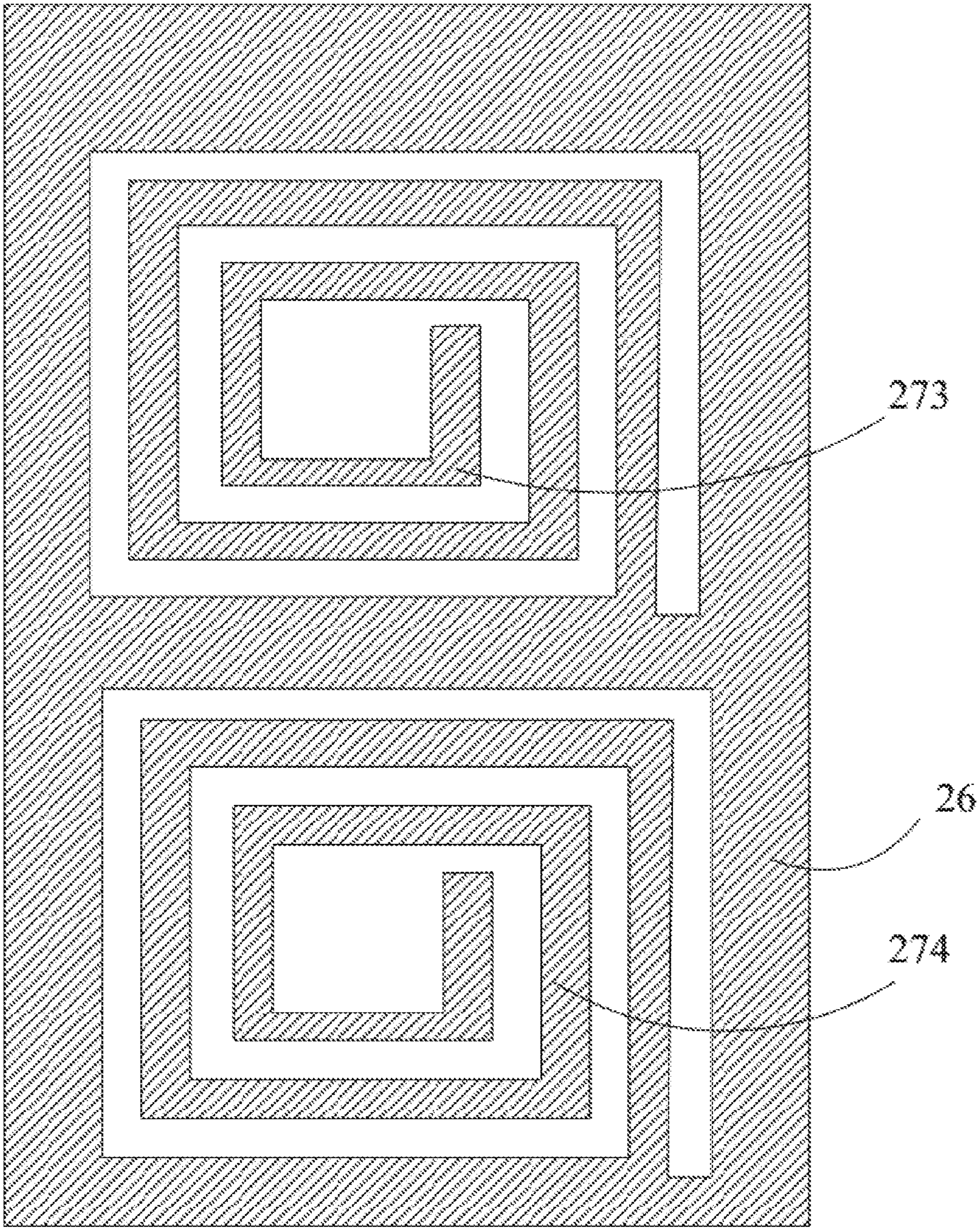
FIG. 5 is a third schematic diagram of a structure of an electrode plate according to an embodiment of the present disclosure.

As shown in FIG. 5, an embodiment of the present disclosure provides a structure of an electrode plate, wherein the electrode plate 26 is hollowed out to form a first inductance 273 and a second inductance 274, and the first inductance 273 is insulated from the second inductance 274.

In the embodiment of the present disclosure, by disposing the first inductance and the second inductance, when the storage capacitor is discharged, the first inductance and the second inductance can charge to the storage capacitor, further stabilize a gate voltage from the storage capacitor to the driving transistor. So that the pixel illumination is not distorted.

In order to clearly illustrate the manner in which the pixels in the display panel are driven, the present disclosure provides the following embodiments.

Figure 6:
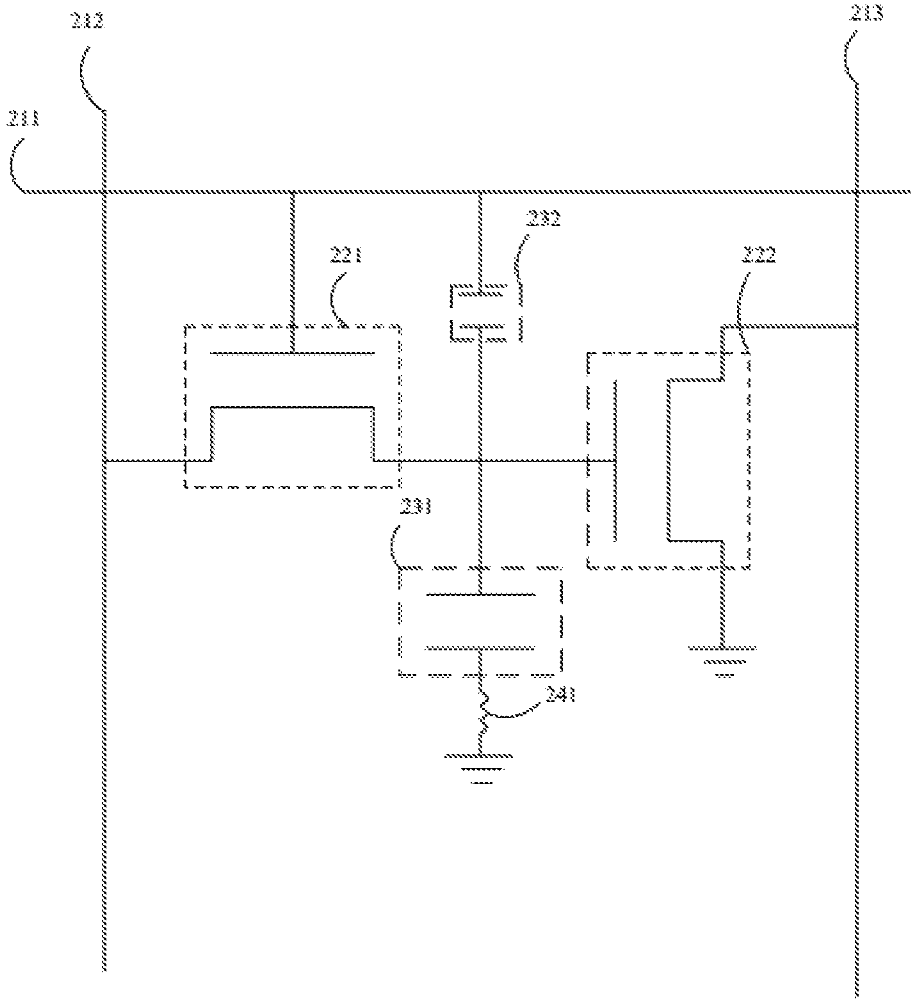
FIG. 6 is a first schematic diagram of a pixel driving circuit according to an embodiment of the present disclosure.

As shown in FIG. 6, an embodiment of the present disclosure provides a pixel driving circuit including a scanning signal line 211, a data signal line 212, a power line 213, a switching transistor 221, a driving transistor 222, a storage capacitor 231, and a charging element 241. A parasitic capacitance 232 exists between the scanning signal line 211 and the storage capacitor 231. By providing a charging element on the pixel driving circuit, the charging element is connected to the storage capacitor. So that when the switching transistor is turned off, the storage capacitor is charged, thereby ensuring a gate voltage of the driving transistor is not lowered, the pixel can emit light as usual, which solves the problem that the current pixel circuit has defects.

Figure 7:
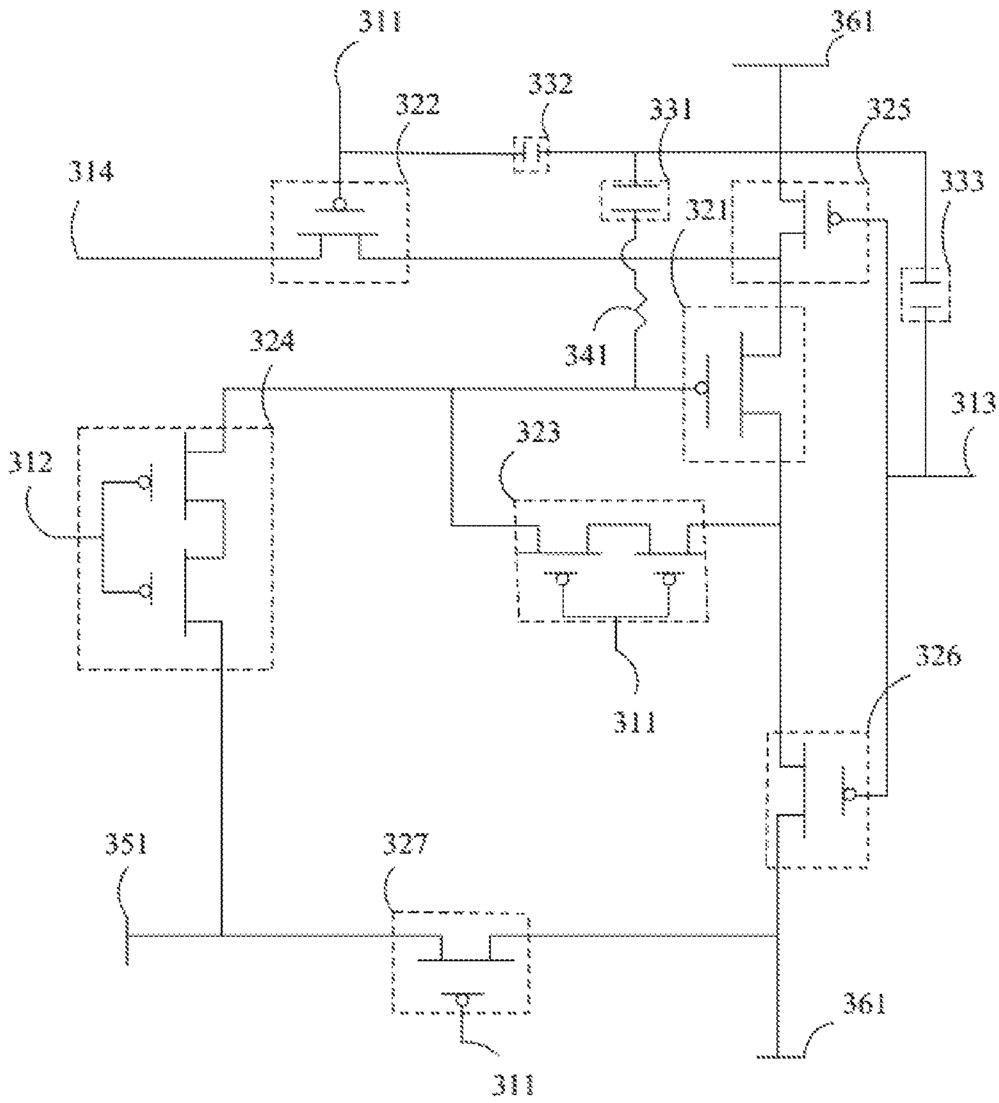
FIG. 7 is a second schematic diagram of a pixel driving circuit according to an embodiment of the present disclosure.

As shown in FIG. 7, an embodiment of the present disclosure provides a pixel driving circuit including a first transistor 321, a second transistor 322, a third transistor 323, a fourth transistor 324, a fifth transistor 325, a sixth transistor 326, a seventh transistor 327, a storage capacitor 331 and a charging element 341. The first transistor 321 is a driving transistor, a first parasitic capacitance 332 exists between a first scanning signal line 311 and a storage capacitor 331. A second scanning signal line 312 is used for controlling the fourth transistor 324 turned on and turned off. A second parasitic capacitance 333 exists between a light emission control line 313 and the storage capacitor 331. When the switching transistor (including the second transistor 322) is turned on, the data signal of the data signal line 314 charge the storage capacitor 331. A reset signal terminal 351 is used for transmit a reset signal to reset a voltage of the anode and a voltage of the storage capacitor. A power source 361 used for providing a data signal for lighting pixels.

In this embodiment, the fifth transistor is used for supplying the data signal of the power source to the first electrode of the first transistor under the control of the light emission control line. The sixth transistor is used for conduction the second electrode of the first transistor and the anode of the pixel under the control of the light emission control line. The second transistor is used for store the data signal of the data signal line to the storage capacitor under the control of the first scanning signal line. The third transistor is used for store a threshold signal of the first scanning signal line to the storage capacitor. The fourth transistor is used for providing a reset signal of the reset signal terminal to the storage capacitor under the control of the second scanning signal line, for resetting the storage capacitor. The seventh transistor is used for providing the reset signal of the reset signal terminal to the anode of the pixel under the control of the first scanning signal line, for reset an anode voltage of the pixel.

In an embodiment, a gate of the fifth transistor is connected to the light emission control line. A first electrode of the fifth transistor is connected to the storage capacitor and the power source. A second electrode of the fifth transistor is connected to the first electrode of the first transistor. A gate of the first transistor is connected to the storage capacitor. A second electrode of the first transistor is connected to a first electrode of the sixth transistor. A gate of the sixth transistor is connected to the illumination control line. The second electrode of the sixth transistor is connected to the anode of the pixel.

In an embodiment, a gate of the second transistor, a gate of the third transistor, and a gate of the seventh transistor are all connected to the first scanning signal line, a first electrode of the second transistor is connected to the data signal line, a second electrode of the second transistor is connected to a first electrode of the first transistor, a first electrode of the third transistor is connected to a second electrode of the first transistor, a second electrode of the third transistor is connected to the storage capacitor, a first electrode of the seventh transistor is connected to the reset signal terminal, and a second electrode of the seventh transistor is connected to the anode of the pixel.

In an embodiment, a gate of the fourth transistor is connected to the second scanning signal line, a first electrode of the fourth transistor is connected to the reset signal terminal, and a second electrode of the fourth transistor is connected to the storage capacitor.

In an embodiment, the first electrode is a source, the second electrode is a drain, or the first electrode is a drain, and the second electrode is a source. The switching transistor and the driving transistor are both P-type transistors, or the switching transistor and the driving transistor are both N-type transistors, or the switching transistor is a P-type transistor, the driving transistor is an N-type transistor, or the switching transistor is an N-type transistor, and the driving transistor is a P-type transistor.

In an embodiment, the charging element includes an inductance, the inductance is disposed between the storage capacitor and a gate of the driving transistor, or the inductance is disposed between the storage capacitor and the power source. When the switching transistor is turned on, the data signal line charge to the storage capacitor and the inductance. When the switching transistor is turned off, the storage capacitor will discharge through the parasitic capacitance, the inductance charge to the storage capacitor, so that the charge of the storage capacitor tends to stable or keep stable. That is, the voltage supplied from the storage capacitor to the driving transistor is ensured to constant, so that the luminance of the pixel is not distorted.

In an embodiment, the charging element includes the first inductance and the second inductance, the first inductance is disposed between the storage capacitor and a gate of the driving transistor, the second inductance is disposed between the storage capacitor and the power source. Sides of the two plates of the storage capacitor are disposed the inductance, and when the switching transistor is turned off, the first inductance and the second inductance charge the storage capacitor, so that the charge of the storage capacitor tends to stable or keep stable. That is, the voltage supplied from the storage capacitor to the driving transistor is ensured to constant, so that the luminance of the pixel is not distorted.

Figure 8:
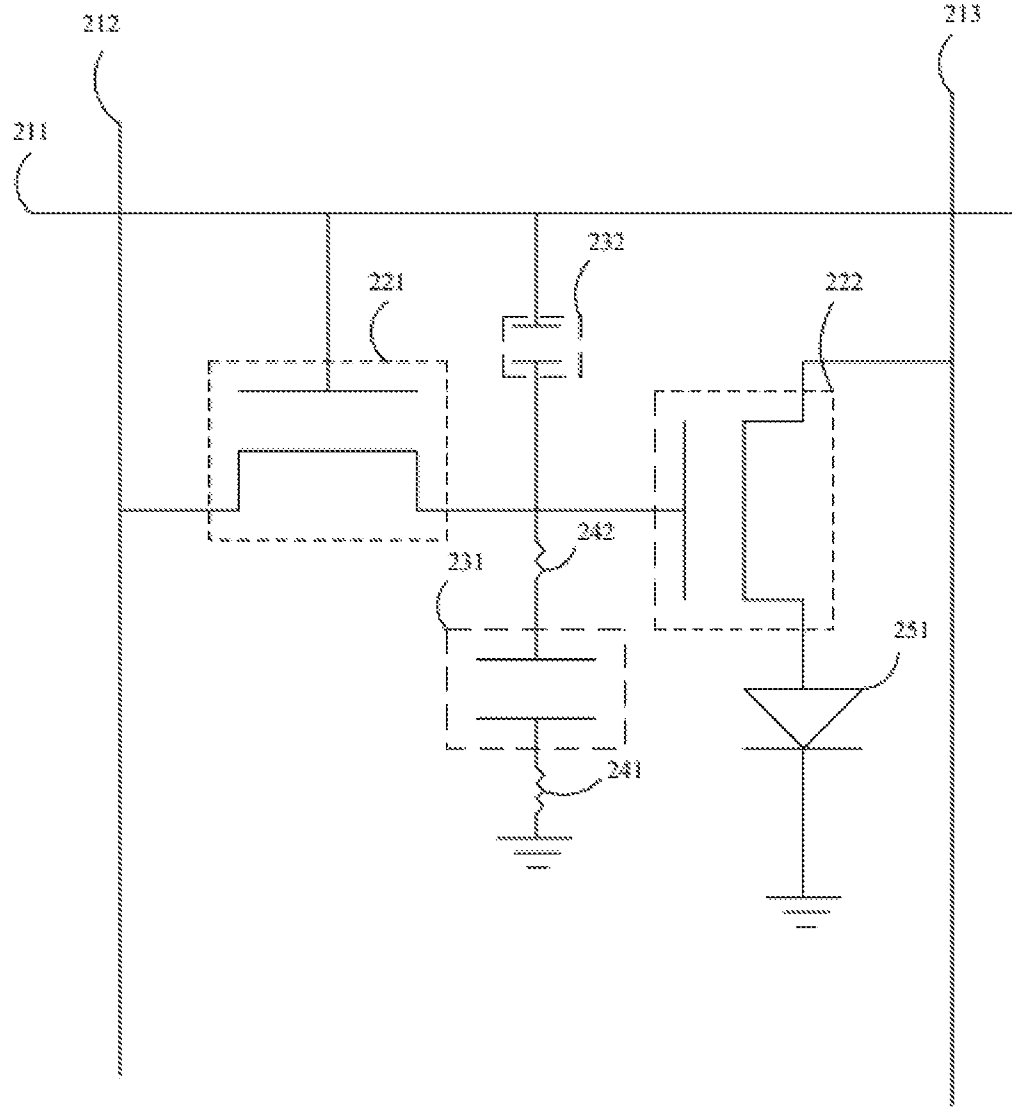
FIG. 8 is a third schematic diagram of a pixel driving circuit according to an embodiment of the present disclosure.

As shown in FIG. 8, an embodiment of the present disclosure provides a display panel including a pixel driving circuit and a pixel 251. The pixel driving circuit includes a scanning signal line 211, a data signal line 212, a power line 213, a switching transistor 221, a driving transistor 222, a storage capacitor 231, a first charging element 241, and a second charging element 242. A parasitic capacitance 232 exists between the scanning signal line 211 and the storage capacitor 231. By providing the first charging element and the second charging element on the pixel driving circuit. So that when the switching transistor is turned off, when the storage capacitor is discharged through the parasitic capacitor, the charging element charges the storage capacitor. So that the charge amount of the storage capacitor remains unchanged, the gate voltage of the driving transistor remains unchanged, the luminance of the pixel is not distorted.

In an embodiment, a display panel includes six switching transistors, one driving transistor, the storage capacitor, the charging element and the pixel, the present embodiment does not limit the pixel driving circuit. For the display panel pixel driver which uses different pixel driving circuit, the present disclosure can solve the problem of pixel illumination distortion.

Figure 9:
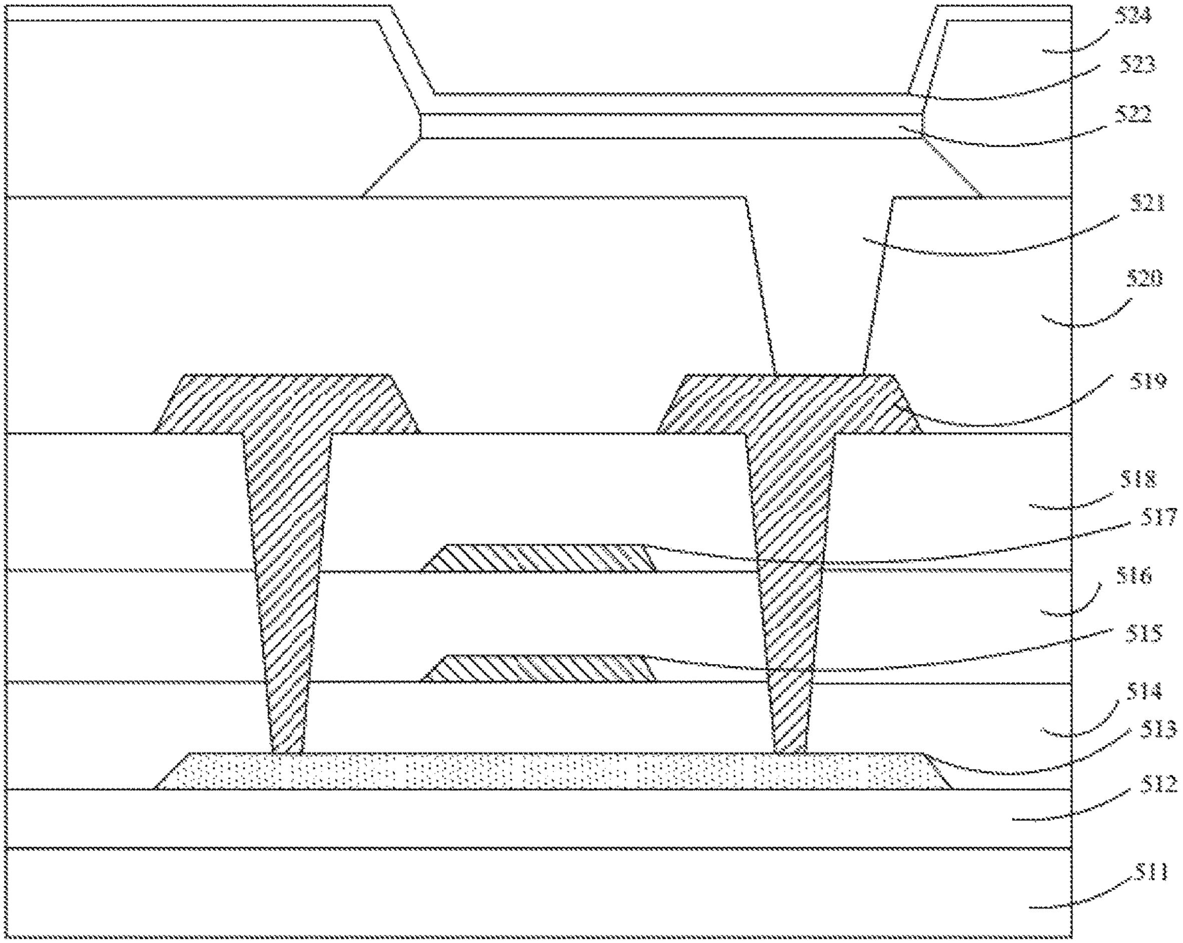
FIG. 9 is a fourth schematic diagram of a pixel driving circuit according to an embodiment of the present disclosure.

As shown in FIG. 9, an embodiment of the present disclosure provides a display panel including a substrate 511, a barrier layer 512, an active layer 513, a gate insulating layer 514, a first metal layer 515, a first interlayer insulating layer 516, a second metal layer 517, a second interlayer insulating layer 518, a source/drain layer 519, a planarization layer 520, an anode layer 521, a luminescent material layer 522, a cathode layer 523, and a pixel defining layer 524. The display panel is provided with the pixel driving circuits in the above embodiments, to display the luminance of the display panel without distortion.

In an embodiment, the pixel driving circuit includes an inductance, a storage capacitor includes a first plate and a second plate. The first plate, a gate of the driving transistor, and the inductance are disposed on the same layer. The first plate, the gate of the driving transistor, and the inductance can be disposed on the first metal layer.

In an embodiment, the pixel driving circuit includes an inductance, a storage capacitor includes a first plate and a second plate. The second plate, the power line, and the inductance are disposed on the same layer. The second plate, the power line and the inductance are disposed on the second metal layer.

In an embodiment, the pixel driving circuit includes an inductance, a storage capacitor includes a first plate and a second plate. The first plate, a gate of the driving transistor, and the inductance can be disposed on the first metal layer. The second plate, the power line and the inductance are disposed on the second metal layer.

In an embodiment, by hollowing out the capacitor plate to form an inductance, so that when forming the pixel driving circuit, the current manufacturing process of the display panel is not affected, and the inductance can be formed on the first metal layer, or be formed on the second metal layer. Further the first inductance can be formed on the first metal layer, and the second inductance can be formed on the second metal layer, the inductance can be formed according to actual requirements, and the manufacturing process of forming the inductance does not affect the current manufacturing process of the display panel.

Meanwhile, the embodiment of the present disclosure further provides a display device, including a display panel, the display panel includes:

a substrate;

a first metal layer on the substrate, that is patterned to form a gate of the transistor;

an interlayer insulating layer; and a second metal layer, disposed on a side of the interlayer insulating layer away from the first metal layer, patterned to form an electrode plate;

wherein the electrode plate overlaps with the gate to form a first plate and a second plate of a storage capacitor, at least one of the plates of the storage capacitor is provided with a charging element, and the charging element is used for charging the storage capacitor.

In an embodiment, in the display device provided in the present disclosure, the charging element includes an inductance structure disposed on at least one of the plates of the storage capacitor.

In an embodiment, in the display device provided in the present disclosure, the inductance structure includes a first inductance, the first inductance formed by hollowing out the first plate.

In an embodiment, in the display device provided in the present disclosure, the first inductance has a homocentric squares shape structure which is not connected end to end.

In an embodiment, in the display device provided in the present disclosure, the first inductance has an annular structure which is not connected end to end.

In an embodiment, in the display provided in the present disclosure, the first inductance is a composite structure consisting of an annular shape and a homocentric squares shape that are not connected end to end.

In an embodiment, in the display device provided in the present disclosure, the inductance structure further includes a second inductance, the second inductance formed by hollowing out the first plate, and the second inductance is insulated from the first inductance.

In an embodiment, in the display device provided in the present disclosure, the inductance structure further comprises a third inductance, the third inductance formed by hollowing out the second plate.

In an embodiment, in the display device provided in the present disclosure, a hollow shape of the third inductance is same as a hollow shape of the first inductance.

In an embodiment, in the display device provided in the present disclosure, a projection of the third inductance coincides with a projection of the first inductance on the substrate.

According to the above embodiment, it can be known that:

The present disclosure provides a display panel and a display device, the display panel includes a substrate, a first metal layer, an interlayer insulating layer and a second metal layer, the first metal layer disposed on the substrate, that is patterned to form a gate of a transistor, the second metal layer is disposed on a side of the interlayer insulating layer away from the first metal layer, patterned to form an electrode plate, and patterned to form an electrode plate, wherein the electrode plate overlaps the gate to form a first plate and a second plate of the storage capacitor, at least one of the plates of the storage capacitor is provided with a charging element, and the charging element is used for charging the storage capacitor. By disposing a charging element on at least one of the plates of the storage capacitor, when the storage capacitor is discharged, the charging element charging the storage capacitor, so that charge of the storage capacitor tends to be stable or keep stable. That is, the voltage supplied from the storage capacitor to the driving transistor is ensured to constant, so that the luminance of the pixel is not distorted, which solves the technical problem of the current pixel circuit.

Meanwhile, in embodiments of the present disclosure, a position of the charging member is not limited, the charging member may be disposed between the gate of the driving transistor and the storage capacitor, or the charging member is disposed between the storage capacitor and the power line. In embodiments of the present disclosure, the number of the charging elements is not limited, one charging element or two charging elements or a plurality of charging elements may be disposed, and the plurality of charging elements may be disposed at different positions. By disposing the above pixel driving circuits in the display panel, the problem that the current display panel has a distortion of display luminance is solved. By forming the charging element on the electrode plate of the storage capacitor, the manufacturing process of the display panel is not affected.

In the above, although the present disclosure has been disclosed in the above preferred embodiments, the preferred embodiments are not intended to limit the disclosure, and those skilled in the art can make various modifications including modified and retouched without departing from the spirit and scope of the disclosure. The scope of protection of the present disclosure is determined by the scope defined by the claims.

What is claimed is:

1. A display panel, comprising:

a substrate;

a first metal layer, disposed on the substrate, that is patterned to form a gate of a transistor;

an interlayer insulating layer; and a second metal layer, disposed on a side of the interlayer insulating layer away from the first metal layer, patterned to form an electrode plate;

wherein the electrode plate overlaps the gate to form a first plate and a second plate of a storage capacitor, at least one of the plates of the storage capacitor is provided with a charging element, and the charging element is used for charging the storage capacitor.

2. The display panel according to claim 1, wherein the charging element comprises an inductance structure disposed on at least one of the plates of the storage capacitor.

3. The display panel according to claim 2, wherein the inductance structure comprises a first inductance, the first inductance formed by hollowing out the first plate.

4. The display panel according to claim 3, wherein the first inductance has a homocentric squares shape structure which is not connected end to end.

5. The display panel according to claim 3, wherein the first inductance has an annular structure which is not connected end to end.

6. The display panel according to claim 3, wherein the first inductance is a composite structure consisting of an annular shape and a homocentric squares shape that are not connected end to end.

7. The display panel according to claim 3, wherein the inductance structure further comprises a second inductance, the second inductance formed by hollowing out the first plate, and the second inductance is insulated from the first inductance.

8. The display panel according to claim 3, wherein the inductance structure further comprises a third inductance, the third inductance formed by hollowing out the second plate.

9. The display panel according to claim 8, wherein a hollow shape of the third inductance is same as a hollow shape of the first inductance.

10. The display panel according to claim 8, wherein a projection of the third inductance coincides with a projection of the first inductance on the substrate.

11. A display device comprising a display panel, wherein the display panel comprises:

a substrate;

a first metal layer, disposed on the substrate, that is patterned to form a gate of a transistor;

an interlayer insulating layer; and a second metal layer, disposed on a side of the interlayer insulating layer away from the first metal layer, patterned to form an electrode plate;

wherein the electrode plate overlaps with the gate to form a first plate and a second plate of a storage capacitor, at least one of the plates of the storage capacitor is provided with a charging element, and the charging element is used for charging the storage capacitor.

12. The display device according to claim 11, wherein the charging element comprises an inductance structure disposed on at least one of the plates of the storage capacitor.

13. The display device according to claim 12, wherein the inductance structure comprises a first inductance, the first inductance formed by hollowing out the first plate.

14. The display device according to claim 13, wherein the first inductance has a homocentric squares shape structure which is not connected end to end.

15. The display device according to claim 13, wherein the first inductance has an annular structure which is not connected end to end.

16. The display device according to claim 13, wherein the first inductance is a composite structure consisting of an annular shape and a homocentric squares shape that are not connected end to end.

17. The display device according to claim 13, wherein the inductance structure further comprises a second inductance, the second inductance formed by hollowing out the first plate, and the second inductance is insulated from the first inductance.

18. The display device according to claim 13, wherein the inductance structure further comprises a third inductance, the third inductance formed by hollowing out the second plate.

19. The display device according to claim 18, wherein a hollow shape of the third inductance is same as a hollow shape of the first inductance.

20. The display device according to claim 18, wherein a projection of the third inductance coincides with a projection of the first inductance on the substrate.

* * * * *